US008389876B2

(12) United States Patent
Emilsson et al.

(10) Patent No.: US 8,389,876 B2
(45) Date of Patent: Mar. 5, 2013

(54) HIGH VOLTAGE BUSHING

(75) Inventors: David Emilsson, Ludvika (SE); Thomas Eriksson, Ludvika (SE)

(73) Assignee: ABB Technology Ltd., Zürich (CH)

( * ) Notice: Subject to any disclaimer, the term of this patent is extended or adjusted under 35 U.S.C. 154(b) by 527 days.

(21) Appl. No.: 12/439,538

(22) PCT Filed: Aug. 30, 2007

(86) PCT No.: PCT/SE2007/050596
§ 371 (c)(1),
(2), (4) Date: Mar. 1, 2009

(87) PCT Pub. No.: WO2008/027004
PCT Pub. Date: Mar. 6, 2008

(65) Prior Publication Data

US 2010/0018752 A1 Jan. 28, 2010

(30) Foreign Application Priority Data

Aug. 31, 2006 (SE) ...................................... 0601784

(51) Int. Cl.
*H02G 3/18* (2006.01)
*H01B 17/26* (2006.01)

(52) U.S. Cl. .................................... 174/650; 174/152 R

(58) Field of Classification Search .................. 174/650, 174/152 G, 153 G, 152 R, 135, 137 R, 10, 174/142, 144
See application file for complete search history.

(56) References Cited

U.S. PATENT DOCUMENTS

| | | | | |
|---|---|---|---|---|
| 1,935,228 | A * | 11/1933 | Kopeliowitsch | 218/118 |
| 4,159,401 | A * | 6/1979 | Kamata | 174/31 R |
| 4,774,385 | A * | 9/1988 | Toshima | 174/142 |
| 5,170,885 | A | 12/1992 | Guenther et al. | |
| 5,466,891 | A * | 11/1995 | Freeman et al. | 174/142 |
| 5,548,081 | A * | 8/1996 | Rost | 174/14 BH |
| 6,107,591 | A * | 8/2000 | Vestner et al. | 218/43 |
| 6,218,627 | B1 * | 4/2001 | Shindo et al. | 174/167 |
| 6,346,677 | B1 * | 2/2002 | Guillemette et al. | 174/142 |
| 7,262,367 | B2 | 8/2007 | Donzel et al. | |

FOREIGN PATENT DOCUMENTS

| | | |
|---|---|---|
| EP | 0404285 A1 | 12/1990 |
| EP | 0935259 | 8/1999 |
| EP | 1577904 A1 | 9/2005 |

OTHER PUBLICATIONS

International Search Report—Nov. 29, 2007.
Written Opinion of the International Searching Authority—Nov. 27, 2007.
European Search Report—Feb. 7, 2012 —issued in EP07794206.

* cited by examiner

*Primary Examiner* — Quyen Leung
*Assistant Examiner* — Eric Johnson
(74) *Attorney, Agent, or Firm* — Venable LLP; Eric J. Franklin

(57) ABSTRACT

A high voltage bushing including a voltage grading shield in two parts.

9 Claims, 2 Drawing Sheets

HIGH VOLTAGE BUSHING

CROSS-REFERENCE TO RELATED APPLICATIONS

This application claims priority to Swedish patent application 0601784-2 filed 31 Aug. 2006 and is the national phase under 35 U.S.C. §371 of PCT/SE2007/050596 filed 30 Aug. 2007.

FIELD OF INVENTION

The present invention relates generally to high voltage bushings and more particularly to a high voltage bushing with simplified manufacturing. The invention also relates to a device comprising such bushing and a method of manufacturing a high voltage bushing.

BACKGROUND

It is known that electrical equipment and devices, such as high voltage transformers, are usually equipped with bushings, which are suitable to carry current at high potential through a grounded barrier, e.g. a transformer tank or a wall.

Conventional bushings are constituted by an insulator made of ceramic or composite material, which is provided with sheds and is generally hollow. The voltage grading can be obtained with or without a condenser body through which the electrical conductor passes.

An example of a bushing 1 for wall mounting will now be described with reference to FIG. 1 showing the overall structure of the bushing, and FIG. 2 showing a sectional view of the bushing mounted to a wall.

A high voltage conductor 2 extends through the center of a hollow gas filled bushing insulator 4 that forms a housing around the high voltage conductor. A wall flange 6 is provided to connect the housing of the bushing to ground through a wall. The high voltage conductor is provided with a contact 8, 10 in both ends thereof.

A wall 12 is shown in FIG. 2, in which the bushing 1 is mounted by means of the wall flange 6. This figure shows a so-called throat shield or voltage grading shield 14 provided inside the hollow bushing insulator 2 at and around the portion of the bushing going through the wall 12. This shield, which is made of a suitable metal, such as aluminum, accomplishes grading of the electrical field in the bushing and is used instead of a condenser core.

In high voltage applications, the voltage grading shield can be very large, such as five meters or more in length, which complicates manufacturing and transportation of the bushing.

SUMMARY OF THE INVENTION

An object of the present invention is to provide a high voltage bushing and a method of manufacturing the same, wherein the manufacturing and handling of the bushing is simplified compared to prior art bushings.

The invention is based on the realization that the voltage grading shield in a bushing can be manufactured in two parts, which are subsequently assembled so as to form one single voltage grading shield.

According to a first aspect of the invention a high voltage bushing for use with a high voltage device is provided, the high voltage bushing comprising a high voltage conductor provided in a hollow insulator housing including a wall flange; and a voltage grading shield provided between the high voltage conductor and the insulator housing; the high voltage bushing being characterized in that the voltage grading shield is provided in at least a first and a second shield part. A high voltage device comprising such bushing is also provided.

According to a second aspect of the invention a method of manufacturing a high voltage bushing is provided, comprising the steps of providing a hollow insulator housing including a wall flange and providing a first shield part of a voltage grading shield in the hollow insulator housing; and; which is characterized by providing a second shield part of a voltage grading shield in the hollow insulator housing; and providing a high voltage conductor inside the voltage grading shield.

With the inventive bushing, several advantages are obtained. By providing a voltage grading shield in two or more parts, the high voltage bushing is easier to manufacture since each part is only about half the size of what it would be as a one piece shield. Also, the reduced sized of the shield parts makes the voltage grading shield easier to handle and store.

In a preferred embodiment, there is a gap between the first and second shield parts. This allows for a dielectrically advantageous design of the end edges of the shield parts. This includes avoiding holes in the voltage grading shield provided for a support for the high voltage conductor used during transportation.

In a preferred embodiment, this gap preferably extends all way about the periphery of the voltage grading shield. Dirt will then less likely enter the voltage grading shield and cause damage while dismounting a conductor support.

In a preferred embodiment, the wall flange comprises two holes diametrically opposite to each other and aligned with the shield gap, wherein a transport support for the high voltage conductor is provided in the holes. This provides for a simple and yet reliable transport support for the conductor. If the transport support comprises a pin and a recessed part between which the conductor is clamped, unwanted horizontal and vertical movement of the conductor is prevented during transportation of the bushing.

BRIEF DESCRIPTION OF DRAWINGS

The invention is now described, by way of example, with reference to the accompanying drawings, in which.

DETAILED DESCRIPTION OF A PREFERRED EMBODIMENT OF THE INVENTION

In the following a detailed description of a preferred embodiment of the present invention will be given. In this description, the term "high voltage" will be used for voltages of 10 kV and higher. Today, the upper limit in commercial high voltage devices is 800 kV but even higher voltages, such as 1000 kV or more, are already built or envisaged in the near future.

Figure 1:
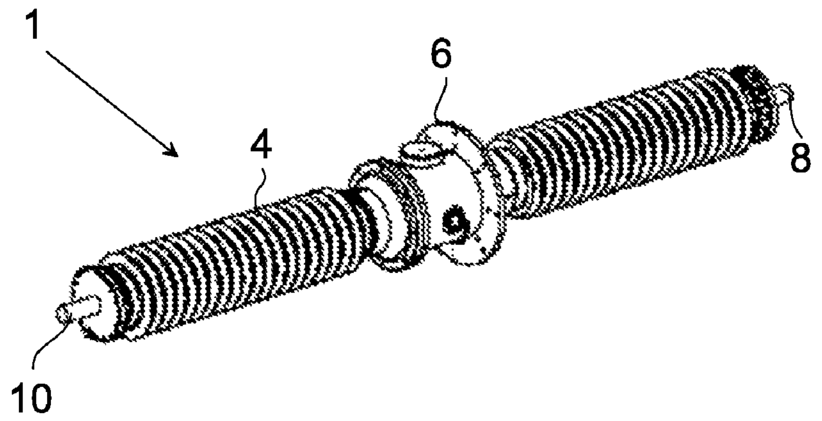
Fig. 1 (Prior art)
FIG. 1 is an overall view of a prior art high voltage bushing.
Figure 2:
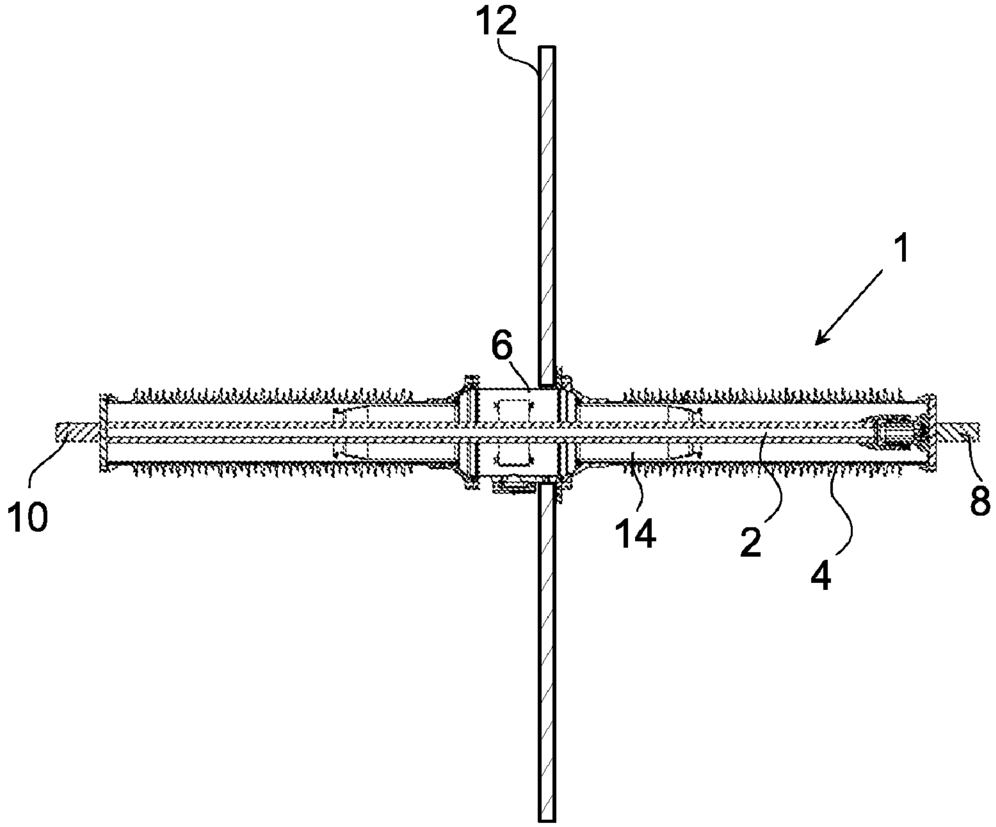
Fig. 2 (Prior art)
FIG. 2 is a sectional view of the bushing of FIG. 1 mounted extending through a wall.
Figure 3:
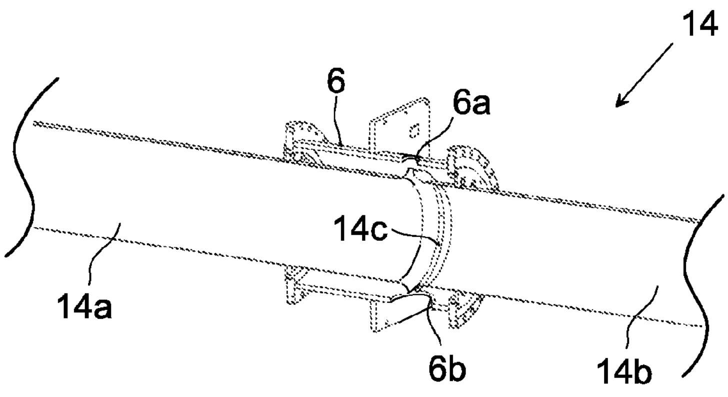
FIG. 3 is a partially cut-away view of the central portion of a voltage grading shield and a wall flange of a bushing according to the invention.

The present invention is applicable to the general description of the high voltage bushing given in the background section with reference to FIGS. 1 and 2 and reference will in the following be made to these figures. However, reference will first be made to FIG. 3, showing a partially cut-away perspective view of a voltage grading shield 14, including a wall flange 6, for a bushing according to the invention.

The voltage grading shield 14 comprises two separate shield parts, a first part 14*a* and a second part 14*b*. The two shield parts are separated by a gap 14*c*, which is symmetrical about the center axis of the voltage grading shield. The end portions of the shield parts facing each other are funnel shaped so as to provide beneficial electrical field distribution in this area.

The wall flange 6 is provided with a first upper circular hole 6*a* for a bursting disc and a second lower circular hole 6*b* for a gas valve. The two holes 6*a*, 6*b* are provided diametrically opposite to each other in the wall flange. The shield parts 14*a*, 14*b* are individually adapted to place the gap 14*c* there between in alignment with the holes 6*a*, 6*b* in the wall flange 6.

Figure 4:
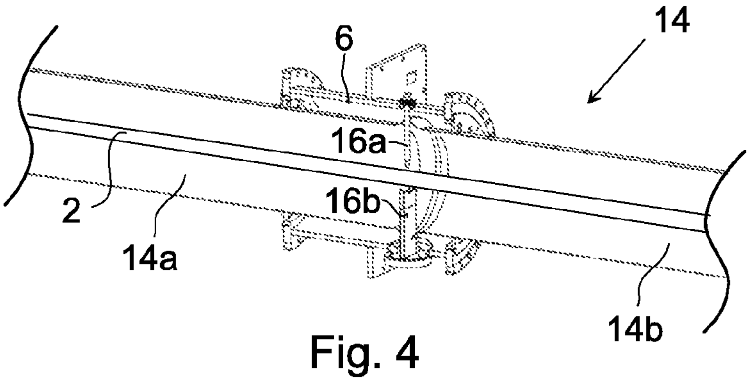
FIG. 4 is a view similar to that of FIG. 3 but also showing a conductor transport support mounted to the bushing.
Figure 5:
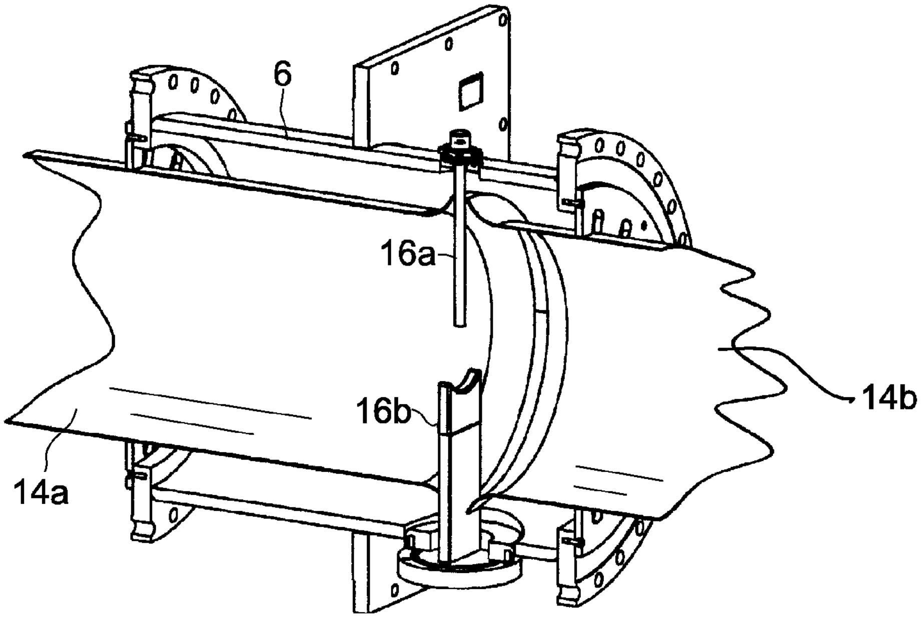
FIG. 5 is a detailed view of the transport support shown in FIG. 4.

The provision of a gap between the two shield parts allows for mounting of a transport support 16*a*, 16*b* for the high voltage conductor 2 in the circular holes 6*a*, 6*b* in the wall flange 6, see FIGS. 4 and 5. The transport support comprises a first part in the form of a pin 16*a* fitted in the first hole 6*a* and a second part in the form of a recessed part 16*b* fitted in the second hole 6*b* and on which the high voltage conductor 2 rests during transportation. The recess of the recessed part 16*b* has a curvature adapted for reception of the high voltage conductor 2. Both the pin 16*a* and the recessed part 16*b* are provided with a soft surface to prevent scratching of the surface of the high voltage conductor. Thus, the conductor 2 is clamped between the first and second part of the transport support, preventing unwanted horizontal and vertical movement of the conductor.

A preferred embodiment of a high voltage bushing has been described. A person skilled in the art realizes that this could be varied within the scope of the appended claims. Thus, although the bushing according to the invention has been described mounted through a wall, is will be appreciated that bushings for assembly to a high voltage device, such as a transformer, reactor, breaker, generator, or other device finding an application in high voltage systems.

The voltage grading shield has been described as being provided in two parts. It is fully possible to provide the voltage grading shield in three or even more separate parts.

The inner ends of the shield parts need not be funnel shaped but can take any suitable shape. Also, the gap between the shield parts need not be symmetric about the center axis of the voltage grading shield.

The transport support parts have been described fitted in the bursting-disc hole and gas valve hole, but can of course be fitted in other suitable holes in the wall flange.

The gap between the two shield parts may not only be used for conductor transport supports. Any other device that should reach the conductor or its surrounding may fit in this gap.

Although the bushing according to the invention has been described mounted through a wall, is will be appreciated that bushings for assembly to a high voltage device, such as a transformer, reactor, breaker, generator, or other device finding an application in high voltage systems are also covered by the inventive idea.

The invention claimed is:

1. A high voltage bushing, comprising:

a high voltage conductor provided in a hollow insulator housing including a wall flange;

a voltage grading shield provided between the high voltage conductor and the insulator housing, the voltage grading shield comprising at least a first shield part and a second shield part having a gap therebetween, wherein the first shield part and the second shield part extend away from the gap, and wherein gap is arranged within the wall flange.

2. The high voltage bushing according to claim 1, wherein the gap extends entirely about the periphery of the voltage grading shield entirely separating the first shield part and the second part.

3. The high voltage bushing according to claim 1, wherein the wall flange comprises two holes diametrically opposite to each other and aligned with the gap between the shield parts, the high voltage bushing further comprising:

a transport support for the high voltage conductor is provided in the holes in the wall flange.

4. The high voltage bushing according to claim 3, wherein the transport support for the high voltage conductor comprises a pin and a recessed part on which the high voltage conductor rests, and wherein the high voltage conductor is clamped between the pin and the recessed part.

5. The high voltage bushing according to claim 1, wherein end portions of the shield parts facing each other are funnel shaped.

6. The high voltage bushing according to claim 1, wherein the voltage grading shield is provided between the high voltage conductor and the wall flange.

7. A high voltage device, comprising:

a high voltage bushing comprising a high voltage conductor provided in a hollow insulator housing including a wall flange, a voltage grading shield provided between the high voltage conductor and the insulator a voltage grading shield provided between the high voltage conductor and the insulator housing, the voltage grading sheild comprising at least a first shield part and a second shield part having a gap therebetween, wherein the first shield part and the second shield part extend away from the gap, and wherein gap is arranged within the wall flange.

8. A method of manufacturing a high voltage bushing, the method comprising:

providing a hollow insulator housing including a wall flange; and providing a first shield part of a voltage grading shield in the hollow insulator housing;

providing a second shield part of a voltage grading shield in the hollow insulator housing arranged with a gap between the first shield part and the second shield part, wherein the first shield part and the second shield part extend away from the gap, and wherein gap is arranged within the wall flange; and providing a high voltage conductor having a first contact and a second contact inside the voltage grading shield.

9. The method according to claim 8, wherein the wall flange comprises two holes diametrically opposite to each other, the method further comprising:

aligning the gap between the shield parts with the two holes in the wall flange;

providing a transport support for the high voltage conductor in the holes in the wall flange; and clamping the high voltage conductor with the transport support.

* * * * *

UNITED STATES PATENT AND TRADEMARK OFFICE

CERTIFICATE OF CORRECTION

PATENT NO. : 8,389,876 B2
APPLICATION NO. : 12/439538
DATED : March 5, 2013
INVENTOR(S) : David Emilsson et al.

It is certified that error appears in the above-identified patent and that said Letters Patent is hereby corrected as shown below:

In the Claims:

Please correct claims 1, 3, 7, and 8 as follows:

Claim 1, Col. 4, line 6, after "gap," insert --wherein an end of the first shield part faces an end of the second shield part across the gap such that the first shield part and the second shield part do not overlap in a radial direction with respect to the conductor,--.

Col. 4, line 6, after "wherein" insert the word --the--.

Claim 3, Col. 4, line 5, after "conductor" delete the word "~~is~~".

Claim 7, Col. 4, line 4, after "flange" delete the "," and insert --and--;

, line 5, after "insulator" delete "~~a voltage grading shield provided between the high voltage conductor and the insulator housing~~";

, lines 7 and 8, after "grading" (line 7) delete the word "sheild" (line 8) and insert the word --shield--

, line 11, after "the gap," insert --wherein an end of the first shield part faces an end of the second shield part across the gap such that the first shield part and the second shield part do not overlap in a radial direction with respect to the conductor,--

, line 11, after "wherein" insert --the--.

Signed and Sealed this
Seventh Day of May, 2013

Teresa Stanek Rea
*Acting Director of the United States Patent and Trademark Office*

Claim 8, Col. 4, line 11, after "gap," insert --wherein an end of the first shield part faces an end of the second shield part across the gap such that the first shield part and the second shield part do not overlap in a radial direction with respect to the conductor,--

, line 11, after "wherein" insert --the--.